April 14, 1959     J. V. DAVIS ET AL     2,881,711
CONVEYOR APPARATUS WITH CONTROLLABLE LIFTING AND LOWERING MEANS
Filed Dec. 14, 1956     4 Sheets-Sheet 1
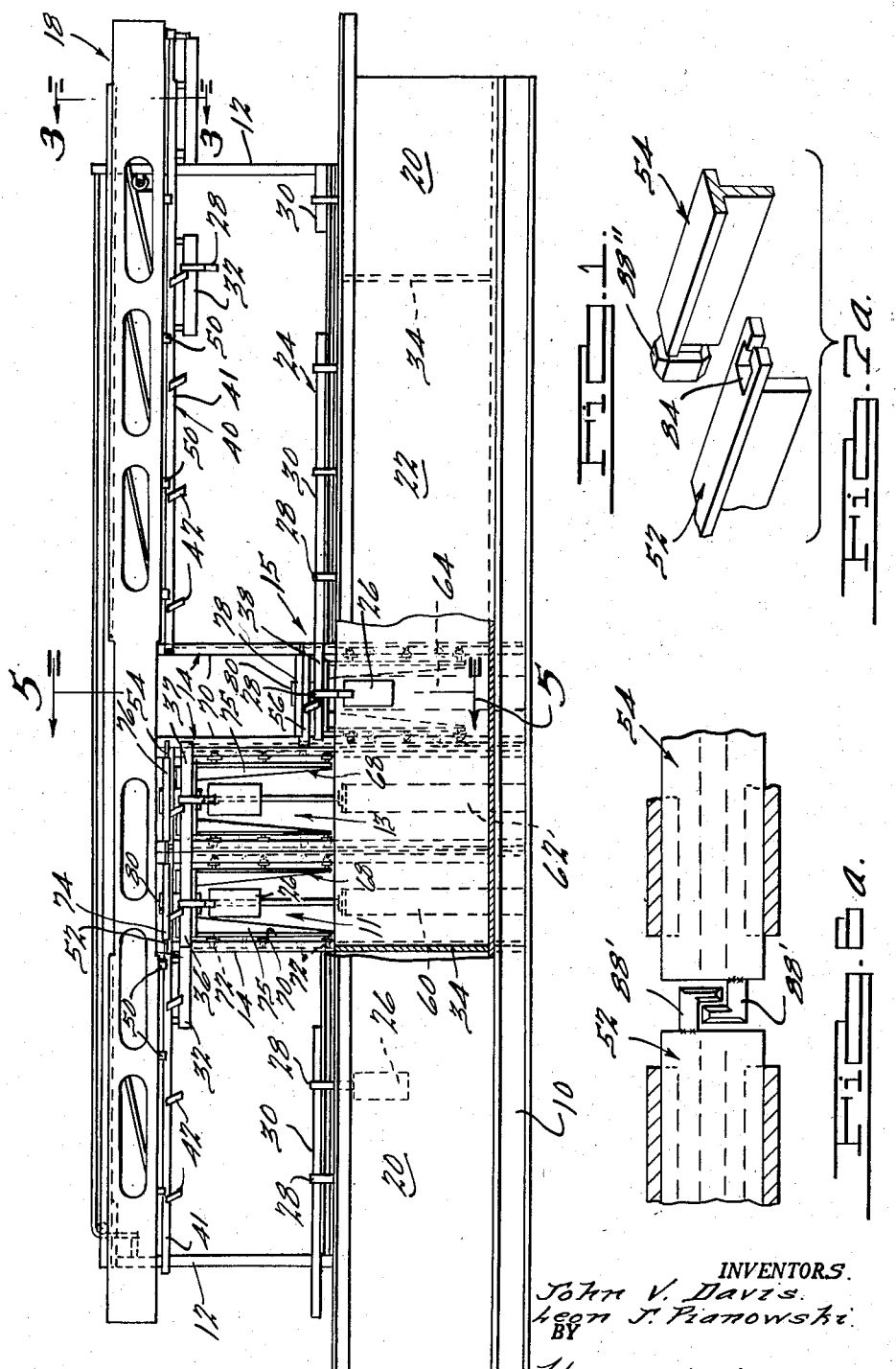
INVENTORS.
John V. Davis.
Leon J. Pianowski.
BY
ATTORNEYS.

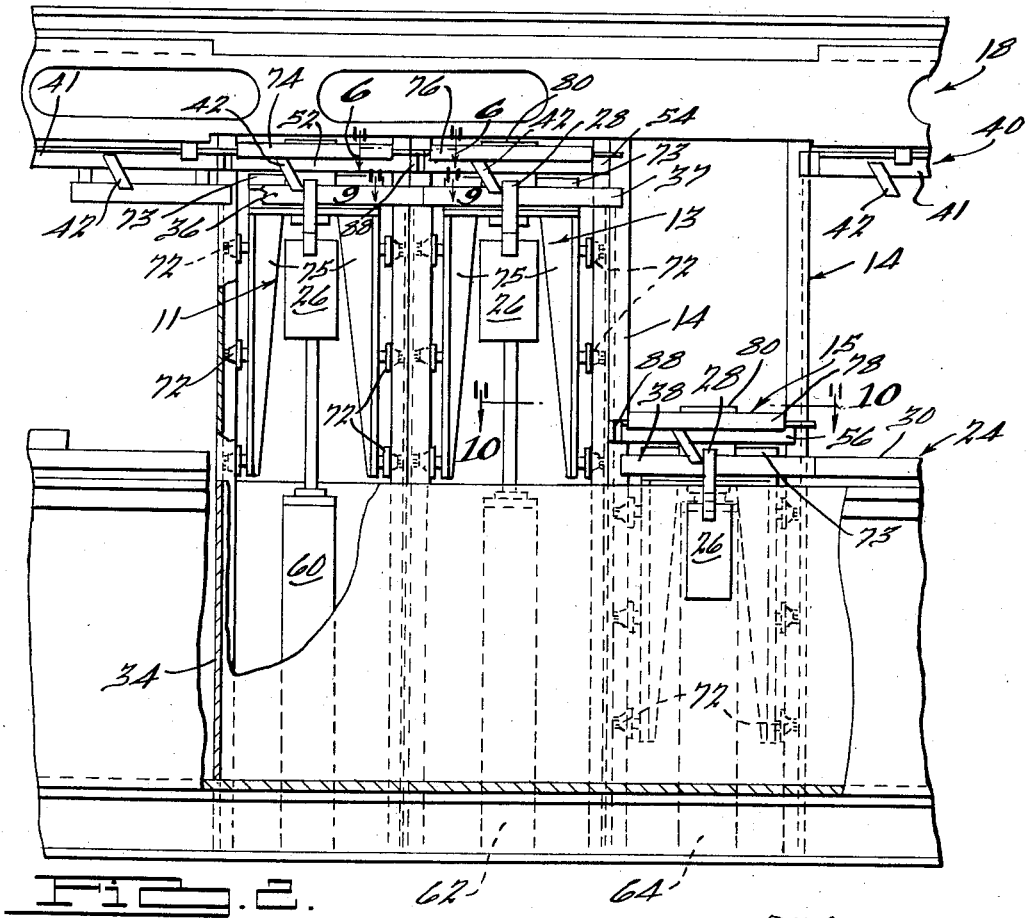

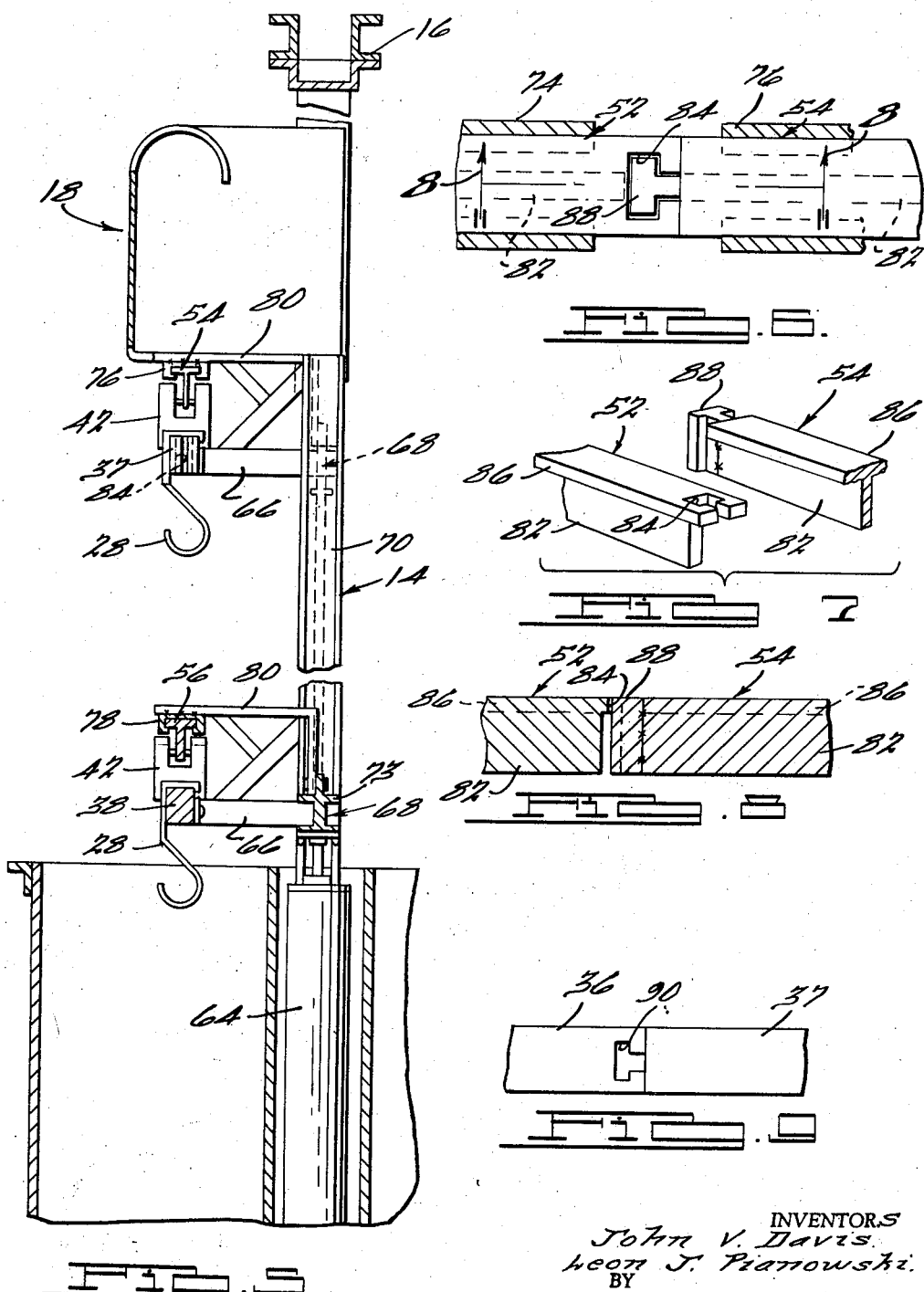

April 14, 1959  J. V. DAVIS ET AL  2,881,711
CONVEYOR APPARATUS WITH CONTROLLABLE LIFTING AND LOWERING MEANS
Filed Dec. 14, 1956  4 Sheets-Sheet 4

INVENTORS.
John V. Davis.
Leon J. Pranowski.
BY
Harness, Dickey & Pierce
ATTORNEYS

United States Patent Office 2,881,711
Patented Apr. 14, 1959

2,881,711

CONVEYOR APPARATUS WITH CONTROLLABLE LIFTING AND LOWERING MEANS

John V. Davis, Grosse Pointe Farms, and Leon J. Pianowski, Detroit, Mich., assignors to The Udylite Corporation, Detroit, Mich., a corporation of Delaware Application December 14, 1956, Serial No. 628,271

9 Claims. (Cl. 104—128)

This invention relates to improvements in a work immersion machine wherein workpieces are advanced from one work station to another as in a plating machine of the general character shown in U.S. Patent No. Re. 24,072, issued October 11, 1955, to John V. Davis. More particularly it pertains to improvements in such a machine whereby the immersion times of workpieces in a bath may be selectively varied in increments totalling more than a complete lifting and lowering cycle of the elevator mechanism of the machine.

In these machines, the workpieces are advanced on a rail by means of pusher members supported on a longitudinal pusher rod carried by a lift frame. In transferring the workpieces over the partitions that define plating bath compartments, sections of the rail with the workpieces supported thereon are raised with the elevator frame, and the work is advanced in the elevated position by actuation of the pusher rod. The rail sections are then lowered, each formerly elevated workpiece being immersed in the bath following that from which it was previously lifted.

One disadvantage of previous machines of this type is their relatively limited flexibility, particularly in that the processing time of workpieces in one bath cannot easily be varied controllably and selectively over a wide range without also varying the lifting and lowering cycles of the elevator mechanisms and thereby also affecting other phases of the process controlled by the machines. In the coloring, or dyeing of anodized aluminum, for example, the dyeing bath becomes depleted with use as more and more workpieces are passed through it. It is relatively difficult to replenish the dye content of the bath continuously to maintain a constant, uniform color on the workpieces. A relatively constant and uniform operation of the bath may, however, be achieved by increasing the time of immersion of the workpieces in the bath progressively as the dye content of the bath is depleted. It is desirable to accomplish this increase selectively, and without changing the duration of the lifting and lowering cycle of the machine that conveys the workpieces through the process. When a typical dye bath is first made up and placed in operation, it may be desired to immerse the workpieces in it for a period corresponding to about four or five complete cycles, i.e., raisings and lowerings of the main lift frame of the machine. As more and more workpieces are processed through the dye bath, the bath becomes depleted and a relatively longer immersion time is required on the subsequent workpieces to achieve the same coloring as the earlier workpieces. After about an hour or so of dyeing workpieces with an immersion time of four or five lift frame cycles, it may then be necessary to increase the immersion time to five or six lift frame cycles. After another hour, the immersion time may need to be increased to six or seven lift frame cycles, and so on.

Accordingly, one important object of the instant invention is to provide, in conjunction with a machine of this type having a system of vertically movable rail sections and a pusher rod mechanism carried by a lift frame, means whereby the immersion period of workpieces in any selected bath, or baths may be controllably varied over a range of more than one complete lifting and lowering cycle of the machine.

This and other objects are accomplished generally according to the invention by the provision of a plurality of contiguous, vertically movable rail sections, or segments disposed over successive, adjacent work stations at any desired location along the machine. Each of the sections is provided with independently controllable means to maintain it in its elevated position when the main lift frame of the machine is lowered. The pusher rod carried by the lift frame is also segmented, the separate pusher rod segments being supported above different respective ones of the rail segments and being vertically movable therewith. Coupling means are provided to couple adjacent ones of the pusher rod segments together, and to the main portions of the pusher rod, when they are aligned in a horizontal plane. These coupling means connect the separate pusher rod segments to the main pusher rod portions for positive reciprocating drive thereby. The coupling means are freely releasable, however, to permit vertical travel of the pusher rod segments with respect to each other and with respect to the main pusher rod portions.

The invention will be described in greater detail in connection with the accompanying drawings of which:

Figure 1 is a side elevational view of a plating machine according to the present invention;

Fig. 2 is an enlarged elevational view of a portion of the machine shown in Fig. 1, showing the structure thereof in greater detail;

Fig. 3 is a fragmentary cross-sectional view of the machine shown in Fig. 1 particularly showing features of the lift frame, the view being taken along the line 3—3 of Fig. 1;

Fig. 4 is a bottom view of the lift frame of the machine as shown in Fig. 3, taken along the section line 4—4 thereof;

Fig. 5 is a fragmentary cross-sectional view of the machine shown in Fig. 1, taken along the section line 5—5 thereof;

Fig. 6 is a fragmentary horizontal sectional view of the machine as shown in Fig. 2, taken along the section line 6—6 thereof and especially showing the pusher rod coupling device;

Fig. 6a is a fragmentary horizontal sectional view generally similar to Fig. 6 but illustrating an alternative coupling arrangement according to the invention;

Fig. 7 is an exploded view of the portion of the machine illustrated in Fig. 6;

Fig. 7a is an exploded view similar to Fig. 7 but showing the coupling device in modified form;

Fig. 8 is a cross-sectional view of the portion of the machine shown in Fig. 6, taken along the section line 8—8 thereof;

Fig. 9 is a fragmentary horizontal sectional view of a portion of the machine as shown in Fig. 2, being taken along the line 9—9 thereof;

Figure 10:
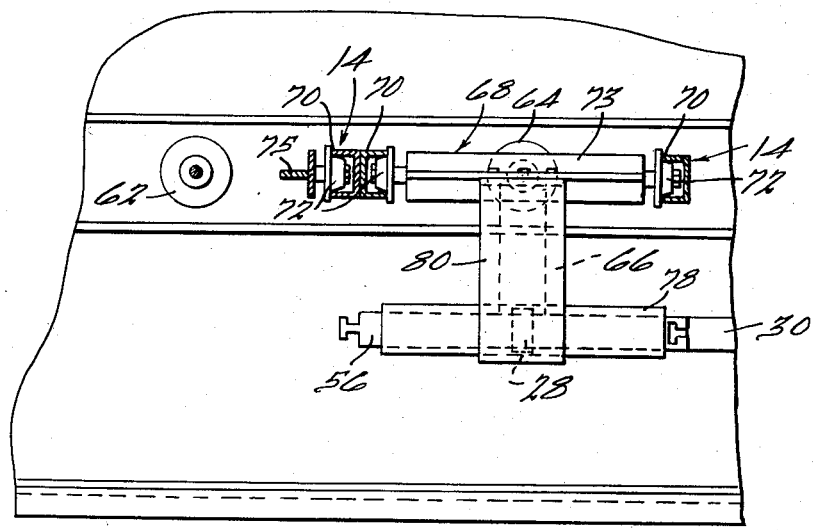
Fig. 10 is a fragmentary horizontal sectional view of the machine as shown in Fig. 2, taken along the line 10—10 thereof.

A preferred embodiment of the present invention comprises a plating machine such as the machine illustrated in the drawings and conforming generally to the structure described and claimed in Patent No. Re. 24,072, except for the provision of a plurality of independently vertically movable lift frame sections 11, 13, and 15, each of which carries a work rail segment and a pusher rod segment. Although only three separate lift frame sections are illustrated, machines according to the invention may include any desired number, preferably two or more of such sections, to provide any desired degree of operating flexibility. And the sections may be placed along the machine at any desired location as determined by the particular process requirements.

The presently described embodiment of the invention is specifically adapted for incorporation in and use with a plating machine of the type disclosed in U.S. Patent No. Re. 24,072. The practice of the invention is not, however, restricted to machines of this type, but is also applicable to any other conveyor apparatus wherein it is desired to advance workpieces through a series of work stations, and selectively to control the entry of the workpieces into selected stations. The practice of the present invention accomplishes this object using a common advancing means for all the workpieces.

Referring now to the drawings, and particularly to Fig. 1 thereof, the machine illustrated therein may be built upon a base 10, and includes a series of longitudinally spaced supporting columns 12 and 14, intermediate ones 14 of which are specially constructed as hereinafter described, and all of which are connected together and braced by a header structure generally designated 16 (Fig. 5). A lift frame 18 is mounted for vertical travel upon the columns 12, and means (not separately designated) are provided to raise and lower it. The general construction of the columns 12, the header 16, the lift frame 18, and the raising and lowering means is not critical in the practice of the present invention and may be varied as desired. These portions of the machine may, for example, be generally similar to the construction shown in the Patent No. Re. 24,072 heretofore referred to, and that patent may be seen for a detailed description of these elements.

A series of processing tanks 20 and 22 are arranged along both sides of the frame and are conveniently supported upon the base 10. The tanks may be arranged in any desired sequence, there being illustratively shown a principal, elongated tank 22, with which the present description of the operation of the machine will be concerned, flanked by pre- and post-treatment tanks 20. A work-supporting rail 24 is mounted above and centrally along the tanks 20 and 22, and extends in an oval path around the machine. Workpieces 26 may be suspended from this rail upon hangers, or hooks 28, and progressively moved along the rail as the processing proceeds. Portions 30 of the rail 24 are rigidly fixed in position upon the tanks 20 and 22 while other portions 32 are mounted upon the lift frame 18 for vertical travel therewith. These rail portions 32 extend across the transverse tank walls 34 which separate the tanks one from another. They support the workpieces 26 when they are raised and lowered and during their horizontal travel in the raised position from one tank to the next over the walls 34. Other portions, or segments 36, 37 and 38 of the rail 24 are vertically movable independently of the lift frame 18, and are used to provide an extended delayed setdown of the workpieces 26 as described in particular detail hereinafter. When the lift frame 18 is lowered and when the rail segments 36, 37 and 38 are also lowered, the stationary rail portions 30, together with the portions or segments 32, 36, 37 and 38, form a continuous rail extending over all of the tanks.

A pusher rod 40 which may be of generally T-shaped cross section is mounted upon the lift frame 18 directly over the rail 24. As described in the patent heretofore referred to, the pusher rod is provided with spaced individual pusher members 42 pivoted upon the web of the bar 40 and positioned to engage the hooks or hangers 28, which are slidably supported at spaced intervals along the rail 24. As shown in Fig. 4, one pusher rod 40 is mounted at each side of the machine, and both of the rods 40 are operated by a single hydraulic cylinder assembly 44 through a crank 46 and drive bars 48. Although only one hydraulic cylinder 44 is needed to actuate both pusher rods 40, the rods 40 are preferably connected at both ends of the machine by crank assemblies similar to the crank 46 and drive bars 48. The pusher rod 40 is supported for smooth, reciprocating, longitudinal travel in slide shoes 50 rigidly mounted upon the lift frame 18.

As most clearly shown in Fig. 2, the pusher rod 40 is not continuous, but includes a number of relatively short, separable segments 52, 54 and 56, the main portions 41 of the rod being supported upon the lift frame 18, and the segments 52, 54 and 56 being individually supported for vertical travel independently of the main lift frame 18. These segments 52, 54 and 56 are rigidly supported above respective ones of the rail segments 36, 37 and 38 for vertical travel with them. When the main lift frame 18 and the individual rail segments 36, 37 and 38 are all lowered to their lowermost positions, or raised to their upper limits, the individual segments 52, 54 and 56 are brought into alignment with the main portion 41 of the rod.

Referring now to Figs. 5 and 10 in conjunction with Fig. 2, the individual rail segments 36, 37 and 38, together with their pusher rod segments 52, 54 and 56, are individually controllable by means of separate hydraulic cylinder and piston assemblies 60, 62 and 64, respectively. Each of the rail segments 36, 37 and 38 is supported upon a pair of arms 66 projecting from a rigid frame 68 which is mounted between a pair of the columns 14 for smooth vertical travel therein. Each of the columns 14 is formed of a pair of vertical channel members 70 standing back to back, the channels 70 of adjacent columns 14 facing each other. The frames 68 are provided with a plurality of laterally projecting rollers 72 which fit within the channels 70 to facilitate smooth, vertical travel of, and to rigidly guide the frames 68.

The construction of the frames 68 is not critical in the practice of the invention except to the extent that they permit smooth vertical travel of the rail segments 36, 37 and 38, and rigidly support the segments and the workpieces suspended thereon. The frames 68 may comprise, as shown illustratively in Figs. 2, 5 and 10, a main cross member 73 to which the arms 66 are secured, and which is directly supported on the hydraulic cylinder assembly 60, 62 or 64. A pair of depending brackets, or arms 75 are rigidly secured to the cross member 73 at the ends thereof, and the roller assemblies 72 are fastened to these arms 75, facing outwardly to engage the channels 70 to guide the frame 68 for smooth vertical travel. The cylinder assemblies 60, 62 and 64 are mounted between the base 10 of the machine and the cross members 73 so that actuation of the cylinders effects raising and lowering of the frames together with the rail segments 36, 37 and 38, and the pusher rod segments 52, 54 and 56, mounted thereon.

Each of the pusher rod segments 52, 54 and 56 is supported within a separate support member, or hangers 74, 76 and 78, respectively, extending along substantially the full length of each segment. The hangers 74, 76 and 78 are rigidly fixed to arms 80 projecting from the frame 68, and the pusher rod segments 52, 54 and 56 are freely longitudinally slidable within the hangers.

Now, when the pusher rod segments 52, 54 and 56 are all aligned with the main pusher rod portions 41, the segments 52, 54 and 56 may be actuated by abutting engagement with the main portions 41. When, however, only one or two of the segments 52, 54 and 56 are aligned with the main portions 41, additional means must be provided to actuate these aligned segments positively in both directions for advance and retraction. For this purpose, the downwardly projecting web 82 of each pusher rod segments 52, 54 and 56 is cut back at the right-hand end as viewed in Figs. 6, 7 and 8, and a T-shaped aperture, or slot 84 is cut into the flange portion 86. The slot 84 has a relatively narrow opening at the end of the segment and a relatively wide inner portion. An engaging key 88, shaped to fit within the slot 84 and to engage the pusher rod segment thereby, is rigidly attached to the opposite, or left-hand end of each segment 52, 54 and 56. The end of the main pusher rod portion 41 adjacent to the end segment 52 is shaped and slotted similarly to the slotted ends of the segments 52, 54 and 56, and a similar engaging key 88 is attached to the end of the pusher rod portion 41 adjacent to the last segment 56. The engaging keys 88 are freely slidable vertically through the respective slots 84 so that the pusher rod segments 52, 54 and 56 may be raised and lowered independently of the main pusher rod portions 41. At the same time, the keys 88 enter the slots 84 when the segments are aligned with the main portions 41, and couple the segments to the main portions for positive longitudinal driving engagement.

As shown in Fig. 9, the rail segments 36, 37 and 38 are slotted at the left-hand end with T-shaped slots 90 to permit passage of the engaging keys 88 without obstruction. Since the rail segments 36, 37 and 38 are not adapted for horizontal movement, no coupling keys corresponding to the keys 88 are needed on the rail.

The specific construction of the pusher rod coupling means is not critical in the practice of the present invention, and any equivalent coupling means may be substituted for the T-bar type shown in Figs. 6, 7 and 8. It is only necessary that the coupling be freely releasable upon vertical travel of one of the coupled members with respect to the other, and provide positive driving engagement between the two members when they are brought into alignment. For example, as illustrated in Fig. 6a, the coupling means may alternatively comprise interlocking, vertically disposed angles 88' welded to the ends of the pusher rod segments 52 and 54. Any type of hooking means that may be freely engaged and released by relative vertical movement of the two coupled segments may be used. In each case, of course, the rail segments 36, 37 and 38 are provided with apertures shaped to accommodate and to permit free passage of any of the coupling parts that project longitudinally from the pusher rod segments.

It may also be desired to bevel, or taper the interengaging parts of the couplings to minimize the chance of binding or jamming. As shown in Fig. 7a, for example, the key 88 may advantageously be beveled, to allow for a greater than normal degree of misalignment and to prevent jamming when the two segments 52 and 54 are relatively far out of alignment as they are brought together.

Figure 11:
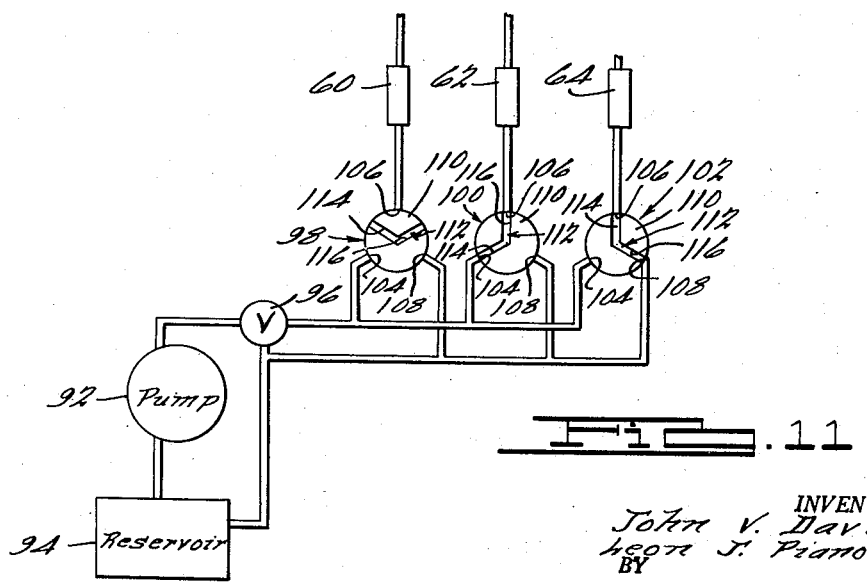
Fig. 11 is a schematic diagram illustrating a hydraulic control system for use in conjunction with the machine shown in the preceding figures.

The elevation and lowering of the individual rail and pusher rod segments may be controlled by a system such as that shown schematically in Fig. 11. This system includes a hydraulic pump 92, which is preferably an auxiliary unit separate and apart from the main hydraulic pump that actuates the main lift frame 18, and which may be driven by any desired means (not shown). The pump 92 is connected at its input to a fluid reservoir 94, and at its output is fitted with a pressure relief valve 96 to which are connected three three-way hydraulic valves 98, 100, and 102, one of these valves for each of the individual cylinders 60, 62 and 64. The operation of the pressure relief valve 96 is preferably timed with respect to the actuation of the main lift frame 18 of the machine, and may, for example, be synchronized therewith so that hydraulic fluid under pressure is transmitted to the three-way valves 98, 100 and 102 during raising of the main lift frame 18, and while the main lift frame is maintained in its elevated position. Similarly, the pressure applied to the three vlaves 98, 100 and 102 may be reduced to a nominal value when the lift frame 18 is lowered.

Each of the individual three-way valves 98, 100 and 102 is connected to a different one of the segment cylinders 60, 62 and 64 to control the actuation thereof in response to the operation of the relief valve 96. Each of the individual valves 98, 100 and 102 is a three-position valve having an inlet port 104 connected to the relief valve 96, an outlet port 106 connected to the input of one of the cylinders 60, 62 and 64, and a return port 108 leading to the non-pressurized hydraulic fluid reservoir 94. All of the valves 98, 100 and 102 are connected directly in parallel between the relief valve 96 and the reservoir 94. Each of the valves is provided with a core 110 defining a passageway 112 having two radially extending, angularly spaced portions 114 and 116 arranged so that when the core is placed in one position all of the ports 104, 106 and 108 are closed to prevent the passage of fluid through the valve in any direction. When the core 110 is turned to a second position, the inlet port 104 is connected through the passageway 112 to the outlet port 106 so that the hydraulic cylinder 60, 62, or 64 connected to the valves 98, 100, or 102 may be operated by the hydraulic pump 92. In its third position, the passageway 112 connects the outlet port 106 to the return port 108 to release fluid from the controlled cylinder and to maintain the segment frame 68 involved in its lowermost position.

In operation of the machine, a predetermined lifting and lowering cycle is arranged for the main lift frame 18 in accordance with conventional practice. As shown in the drawings, the machine is arranged to advance the workpieces from left to right. The cycle of the lift frame 18 is, briefly, as follows, taking as a starting point a time when the lift frame is in its lowered position, and the pusher rod 40 is retracted, that is, the pusher rod has been moved to the left to the limit of its travel. The first phase of the cycle then is lifting of the lift frame 18 to its fully elevated position. The second phase is an advance and a retraction of the pusher rod 40 to move the workpieces 26 along the elevated rail portions 32, and along whichever of the sections 36, 37 and 38 that are elevated at this time. The third phase of the cycle is the lowering of the lift frame 18 to its fully lowered position, and the fourth phase is an advance and retraction of the pusher rod 40 to advance all the workpieces 26 that are on the lowered rail portions 30, 32, and possibly 36, 37 and 38, along the tank to their next stations. This completes the cycle, which is then repeated as the work progresses.

With this basic understanding of the operating sequence of the machine, the function of the individual segment assemblies may now be described in greater detail. The stroke of the pusher rod 40 is slightly less than the length of each one of the individual rail segments 36, 37 and 38, and pusher dogs 42 are positioned on the pusher rod segments 52, 54 and 56 to advance workpieces 26 from one rail segment to the next adjoining segment upon each advancing stroke. In Fig. 11, the control valves 98, 100 and 102 are illustratively shown as set so that the third hydraulic cylinder 64 is de-energized and the frame 68 associated with it remains in its lowered position. This setting of the control valves corresponds to the position of the machine illustrated in Figs. 1 and 2. The right-hand, or third independent rail segment 38 thus is kept in alignment with and effectively becomes a part of the stationary rail portion 30. The valve 100 that controls the central hydraulic cylinder 62 is set to connect this cylinder 62 to the hydraulic pump 92, the output of which is controlled by the relief valve 96 so that the central rail section 37 will be raised and lowered along with the main lift frame 18. The left-hand cylinder 60 is locked in its extended position by closing the valve 98 to keep the left-hand rail segment 36 raised so that workpieces 26 supported on this segment are not lowered into the tank 22, but are carried above the tank until they move to the central segment 37.

Each workpiece 26 approaches the tank 22 from the left, as viewed in Figs. 1 and 2, and is advanced along the rail 30 in a stepwise fashion, being moved one step forward along the rail portion 30 each time the lift frame 18 is lowered and the pusher rod 40 advanced. After a workpiece 26 is advanced onto the first rail section 32, which is attached to the lift frame 18, it is raised with the lift frame 18 to a position above the tank wall 34, and when the pusher rods 40 are actuated the workpiece is advanced across the wall 34 and off the section 32 onto the adjoining independent segment 36. When the lift frame 18 next descends, the first independent segment 36 remains in its elevated position, and the workpiece 26 is held by it and not lowered into the tank 22. The next time the lift frame is raised, the workpiece 26, which was placed upon the first independent segment 36, is advanced onto the second, or central independent segment 37, and, the valve 100 being set to operate this segment 37, the workpiece 26 is lowered into the tank upon the next lowering of the main lift frame 18. It is then advanced by pusher rod actuation from the central independent segment 37 to the right-hand, or third independent segment 38. The workpiece 26 thereafter remains lowered and immersed in the tank 22 as it progresses stepwise along the length of the stationary rail portion 30 overlying the tank 22 until it reaches the right-hand rail segment 32, on which in the normal way the workpiece 26 is passed over the right-hand tank wall 34. Subsequent workpieces 26 continue to progress through the process according to the same pattern.

The immersion time of the workpieces 26 in the elongated treating tank 22 may be varied in two major steps, i.e., three different processing periods may be obtained, each step being equal to one complete cycle of the main lift frame 18. If maximum delayed set-down is desired, i.e., for minimum time of immersion in the tank, both the first two cylinders 60 and 62 are locked in their elevated, or extended positions by closing both of the valves 98 and 100, and only the third cylinder 64 is actuated, by setting the valve 102 to connect its inlet port 104 to its outlet port 106. In this case, the first two rail segments 36 and 37 are maintained elevated at all times. and the workpieces 26 are suspended over the leading portions of the tank 22 for two complete raising and lowering cycles of the lift frame 18, being lowered into the tank only when they are advanced onto the third independent segment 38. If full use is to be made of the tank 22, the maximum immersion time obtained without any delayed set-down, the second two cylinders 62 and 64 are ported directly to the reservoir 94 through the valves 100 and 102, and the first cylinder 60 is connected to the hydraulic pump 92 by appropriately setting the valve 98. The last two independent rail segments 37 and 38 are then maintained in their lowered positions and effectively become part of the stationary rail 30, while the workpieces 26 are lowered into the tank 22 at its input end by the first independent segment 36.

The use of a multiple-segmented rail 24 is made possible in the practice of the present invention by the provision of releasable, positive coupling means by which the main pusher rod portions 41 are enabled to actuate the individual pusher rod segments 52, 54 and 56 regardless of the set-down delay. Without the provision of such releasable coupling means, such as the slots 84 and keys 88, positive actuation of the individual pusher rod segments 52, 54 and 56 would require an extremely complicated arrangement, and might even be totally unfeasible. In the present structure, when, for example, either one or both of the left-hand segments 52 and 54 are elevated and the segment 56 is lowered, the coupling arrangement provides positive engagement for reciprocating longitudinal actuation of the pusher rod segment 56. At the same time, the arrangement permits free and independent vertical travel of the separate segments. As many individual segment assemblies as required or desired may be used to provide any desired degree of processing flexibility, and, of course, intermediate delays may be readily provided by varying the timing arrangement of the relief valve 96 to delay the set-down of the segment being controlled through any portion of the lowering phase of the lift frame 18. It is only necessary in this event to delay the pusher rod actuation until after the controlled segment has been fully lowered.

It will be appreciated that the practice of the invention is not limited to the specific coupling structures illustrated in Figs. 6, 6a, 7, 7a and 8. Any of many other alternative coupling means may be substituted for those shown and are contemplated. It is only necessary that the coupling be freely releasable to permit relative vertical travel between the coupled members and be positively engaged when the members are brought into alignment with each other. Such alternative arrangements may comprise, for example, spherically, or conically shaped keys, engageable in round keyholes, or hook-shaped mating members of double-bent configuration. In each case, of course, the rail segments are correspondingly apertured to permit free travel of any projecting portions of the coupling.

While the apparatus described herein is especially adapted for incorporation in and use with apparatus of the type disclosed in U.S. Patent Re. 24,072, it is not restricted to such applications, but rather is applicable to any conveyor mechanism wherein it is desired to advance workpieces through a series of operations which permit controlled delay of the movement of selected workpieces into selected stations while employing a common advancing means.

What is claimed is:

1. Conveyor apparatus comprising a vertically reciprocable lift frame, a discontinuous pusher rod mounted on said frame and horizontally reciprocable with respect thereto, pusher rod segments alignable with said discontinuous pusher rod to fill in the discontinuities thereof, said segments being mounted for reciprocating horizontal travel and being vertically movable relative to said lift frame, and means to couple said segments to said discontinuous pusher rod for reciprocating horizontal drive thereby.

2. Conveyor apparatus comprising a vertically reciprocable lift frame, a discontinuous pusher rod mounted on said frame and horizontally reciprocable with respect thereto, pusher rod segments alignable with said discontinuous pusher rod to fill in the discontinuities thereof, said segments being horizontally movable and being vertically reciprocable independently of said lift frame, means to raise and lower each one of said segments independently, and means automatically to couple said segments to said discontinuous pusher rod when they are aligned therewith for reciprocating horizontal drive thereby, said coupling means being disengageable by vertical movement of said discontinuous pusher rod with respect to said segments out of alignment therewith.

3. Conveyor apparatus comprising a plurality of vertically and horizontally reciprocable pusher rod segments, said segments being aligned in a vertical plane and being alignable in horizontal planes, and coupling means to couple adjacent ones of said segments together when they are aligned in a horizontal plane.

4. Conveyor apparatus comprising a central frame, means defining a workpiece travel path along said frame, a lift frame mounted for reciprocating vertical travel on said central frame, discontinuous pusher rod means for effecting motion of workpieces along said path, drive means coupling to said rod means at the ends thereof to reciprocate said rod means horizontally when said lift frame is in its raised position and when said lift frame is in its lowered position, a plurality of pusher rod segments mounted on said central frame for horizontal reciprocating movement thereon and for vertical movement relative to said lift frame, said segments being aligned in a vertical plane with said rod means and being alignable therewith in horizontal planes to fill the discontinuities thereof, and coupling means to couple said rod means and adjacent ones of said segments together when they are aligned in a horizontal plane, said coupling means being releasable by relative vertical movement between said segments and said rod means.

5. Conveyor apparatus comprising a central frame, a lift frame mounted for reciprocating vertical travel thereon, a workpiece-supporting rail extending along said central frame, a pusher rod positioned above said rail and adapted upon reciprocation back and forth along said central frame to advance workpieces supported on said rail, end portions of said pusher rod being supported upon said lift frame for vertical travel therewith, means to reciprocate said end portions horizontally upon said lift frame, said pusher rod including a plurality of rod segments disposed between and alignable with said end portions, said rod segments being vertically movable independently of said lift frame, said rail including a plurality of rail segments, each one of said rail segments being mounted for vertical movement with and aligned with a different one of said rod segments, and means to couple said rod segments together and to said end portions for positive reciprocating driving engagement when they are aligned one with another.

6. Conveyor apparatus comprising a central frame, a lift frame mounted for reciprocating vertical travel thereon, a workpiece-supporting rail extending along said central frame, a pusher rod positioned above said rail and adapted upon reciprocation back and forth along said central frame to advance workpieces supported on said rail, end portions of said pusher rod being supported upon said lift frame for vertical travel therewith, means to reciprocate said end portions horizontally upon said lift frame, said pusher rod including a plurality of rod segments disposed between and alignable with said end portions, said rod segments being vertically movable independently of said lift frame, said rail including a plurality of rail segments, each one of said rail segments being mounted beneath a different one of said rod segments, and means to couple said rod segments together and to said end portions for positive reciprocating driving engagement when they are aligned one with another, said coupling means including keyways of re-entrant shape in their horizontal sections and having straight vertical sides defined by each of said rod segments at one end thereof and by one of said end portions at the end thereof adjacent to said rod segments, and a key shaped to fit said keyway for horizontal driving engagement therewith fixed on the opposite end of each one of said rod segments and the end of the other one of said end portions adjacent to said rod segments, said keys being freely slidable vertically through said keyways, and said rail segments defining vertically extending apertures shaped and positioned to permit free and unobstructed vertical passage of said keys when said rod segments travel vertically past one another and past said rail segments.

7. Conveyor apparatus comprising a workpiece-supporting rail including a stationary portion and a plurality of vertically movable segments, said segments being movable to an aligned position wherein they are aligned with said stationary portion and being movable independently of each other away from said aligned position, and means to advance workpieces along said stationary portion and along ones of said segments aligned therewith when other ones of said segments are away from said aligned position, and advancing means operable to advance workpieces along said other segments during times when they are away from said aligned position.

8. In conveyor apparatus of the type including an elongated central frame, a lift frame mounted for vertical travel on said central frame, means for raising and lowering said lift frame, a workpiece-supporting segmented rail extending along said central frame beneath said lift frame, and means for pushing workpieces along said rail, the improvement comprising pusher rod end portions in general alignment with said rail and longitudinally reciprocatable with respect thereto, power means for reciprocating said end portions, intermediate pusher rod portions mounted for vertical travel independently of said lift frame and alignable with said end portions, means for controllably raising and lowering said intermediate portions, and coupling means for coupling said intermediate portions to said end portions when they are aligned therewith for reciprocating longitudinal drive thereby.

9. In conveyor apparatus of the type including an elongated central frame, a lift frame mounted for vertical travel on said central frame, means for raising and lowering said lift frame, a workpiece-supporting segmented rail extending along said central frame beneath said lift frame, and means for pushing workpieces along said rail, the improvement comprising pusher rod end portions in general alignment with said rail and longitudinally reciprocatable with respect thereto, pusher members mounted on said end portions for engaging workpieces carried on the rail, power means for reciprocating said end portions, intermediate pusher rod portions mounted for vertical travel independently of said lift frame and alignable with said end portions, means for controllably raising and lowering said intermediate portions, selected segments of said rail being mounted for vertical travel with said intermediate pusher rod portions and being alignable with other segments of said rail at both the upper and lower limits of their vertical travel, and coupling means for coupling said intermediate pusher rod portions to said end portions when they are aligned therewith for reciprocating longitudinal drive thereby.

References Cited in the file of this patent

UNITED STATES PATENTS

| | | |
|---|---|---|
| Re. 24,072 | Davis | Oct. 11, 1955 |
| 2,591,681 | Davis | Apr. 8, 1952 |
| 2,736,441 | Hauck | Feb. 28, 1956 |
| 2,738,888 | Todd et al. | Mar. 20, 1956 |